No. 11,716. Reissued Feb. 7, 1899.
A. C. McCORD.
CAR AXLE BOX AND LID.
(Application filed Dec. 8, 1897.)
2 Sheets—Sheet 1.
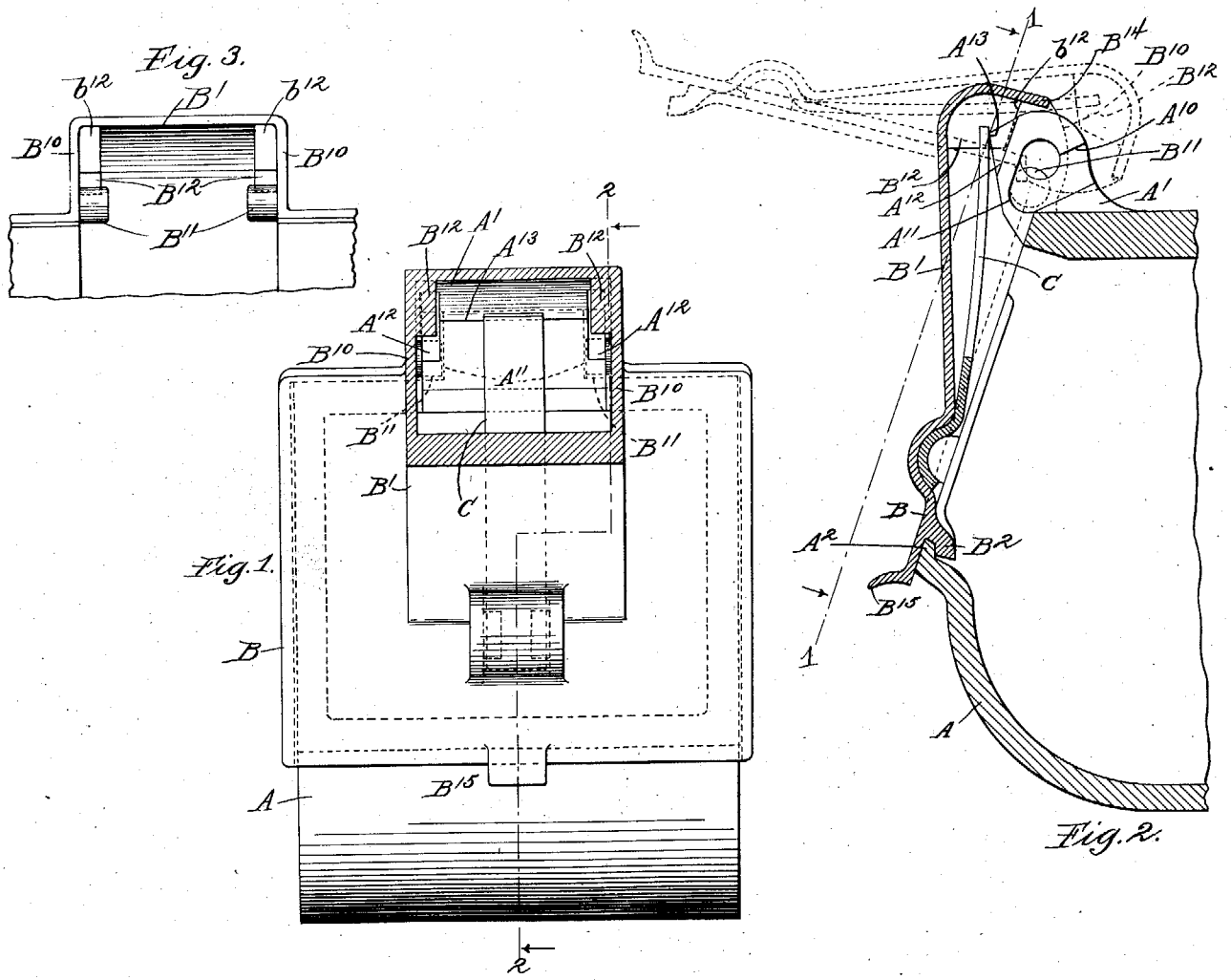
Witnesses:
L. M. C. Sanner,
John W. Sinclair
Inventor,
A. C. McCord,
By Barton & Brown
Attorneys.

No. 11,716. Reissued Feb. 7, 1899.

A. C. McCORD.

CAR AXLE BOX AND LID.

(Application filed Dec. 8, 1897.)

2 Sheets—Sheet 2.

Witnesses:
L. M. Gannett
John W. Sinclair

Inventor,
A. C. McCord,
By Barton & Brown
Attorneys.

UNITED STATES PATENT OFFICE.

ALVIN C. McCORD, OF CHICAGO, ILLINOIS, ASSIGNOR, BY MESNE ASSIGNMENTS, TO THE McCORD & COMPANY, OF SAME PLACE.

CAR-AXLE BOX AND LID.

SPECIFICATION forming part of Reissued Letters Patent No. 11,716, dated February 7, 1899.

Original No. 578,521, dated March 9, 1897. Application for reissue filed December 8, 1897. Serial No. 661,201.

*To all whom it may concern:*

Be it known that I, ALVIN C. McCORD, a citizen of the United States, residing at Chicago, county of Cook, and State of Illinois, have invented certain new and useful Improvements in Car-Axle Boxes and Lids, which are fully set forth in the following specification, reference being had to the accompanying drawings, forming a part thereof.

Figure 4:
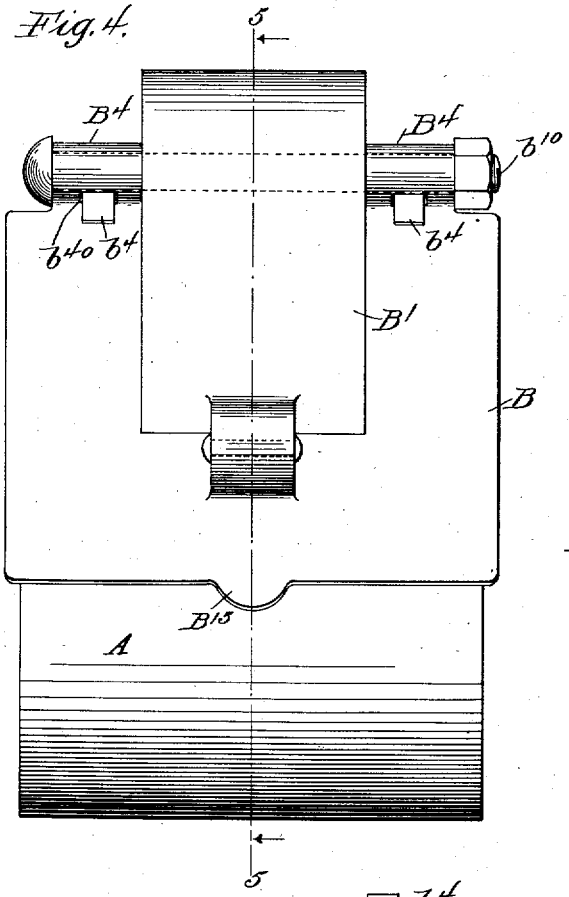
Figure 5:
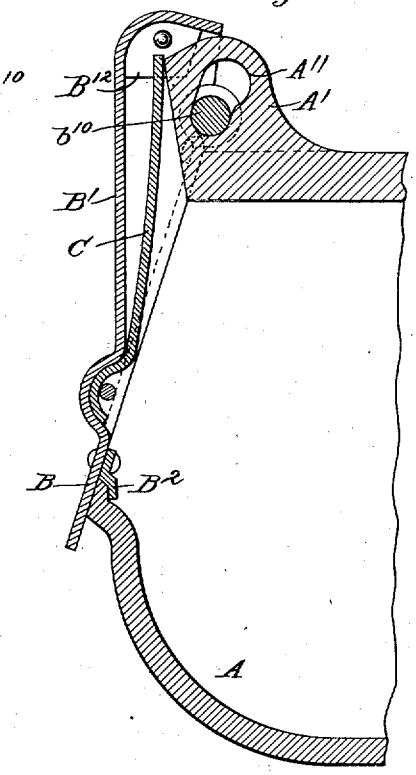
Figure 6:
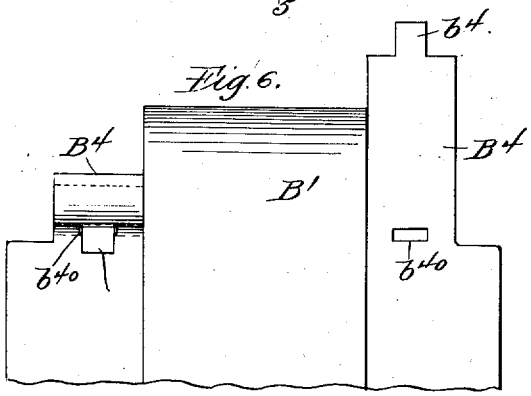
Figure 7:
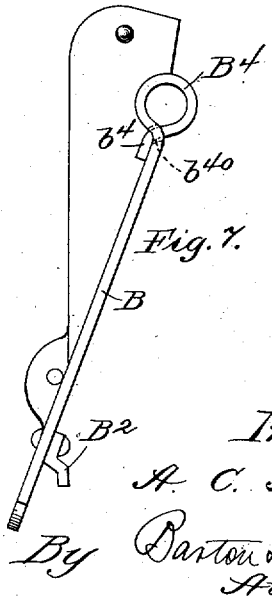

In the drawings, Figure 1 is a sectional front elevation of my improved axle-box and lid, section being made at the plane indicated by the line 1 1 on Fig. 2. Fig. 2 is a section at the line 2 2 on Fig. 1. Fig. 3 is a detail inner side elevation of the hinge end of the cover. Fig. 4 is an elevation showing my improved lid when made of pressed steel. Fig. 5 is a section at the line 5 5 on Fig. 4. Fig. 6 is a plan of a blank partly shaped up, showing a specific preferred construction of the lid when made of pressed steel. Fig. 7 is an edge elevation of such lid.

The axle-box A is of ordinary construction except in so far as it is adapted in detail at points hereinafter described to receive my improved lid. B is the lid. Upon the upper side of the box, midway in its width, there is formed a boss or lug A′ for the purpose of hinging the lid thereto. The lid is formed with a hood-like hollow boss B′, erected midway in its width at the upper part of its length and extending up far enough to cover the boss A′ at the upper side. This hood B′ constitutes the housing for the spring C, and side webs $B^{10}$ $B^{10}$ of the hood in the cast form of my invention afford the support for the pivots of the lid on the box, for from the inner surface of the webs $B^{10}$ trunnions $B^{11}$ $B^{11}$ protrude inwardly, taking into the pivot-sockets $A^{11}$ $A^{11}$ in the opposite sides of the boss A′ on the box. When this form is adopted, the hinge-trunnions $B^{11}$ reach their seats in the pivot-sockets through the slots $A^{10}$ $A^{10}$, which lead from the rear side of the lug A′ at the opposite edges, as clearly seen in Fig. 2. The pivot-sockets $A^{11}$ are elongated in the direction of the box-face or seat of the lid on the box, so that when the lid has its trunnions engaged in the sockets, respectively, and is resting on the face of the box-opening it can slide thereon a distance corresponding to the elongation of the sockets, and the lid, at or near its lower or forward edge, has a lip $B^2$, which is adapted to pass into the box-opening and to engage the lower edge or lip $A^2$ of that opening to divert the oil which flows down the inner side of the lid back into the box, and also to coöperate with other features to lock the lid when it is seated. The boss A′ at the opposite edges has the shoulders $A^{12}$ $A^{12}$ parallel with the face of the box-opening on which the lid seats, and the lid B has in the corners of the hood B′ interior bosses or blocks $B^{12}$, which form shoulders $b^{12}$, conformed to and adapted to seat upon the shoulders $A^{12}$ when the lid is swung down onto the face of the box and the pivot-trunnions are at the lower limit of their elongated sockets $A^{11}$; but said blocks $B^{12}$ are cut away at the forward side to terminate the shoulders $b^{12}$ at such point that when the lid is pushed up so that the trunnions are at the upper end of the sockets said shoulders are clear of the shoulders $A^{12}$, and the lid may be swung upward freely, the forward corner of the shoulders $b^{12}$ following over the rear or upper curve of the boss A′, as shown by the dotted-line position in Fig. 2; but it will be noticed that before the swinging movement of the lid can be made the shoulders $b^{12}$ must be clear of the shoulders $A^{12}$ and that the lid having been pushed up to this point the lifting of the lid to the slightest extent tends to lock the lid against sliding down again, because thereby the shoulder $b^{12}$ is carried over the upper corner of the shoulder $A^{12}$ onto the upper curve of the lug A′, and the lid is thereby retained with its pivot at the upper end of the socket throughout the remainder of the opening movement.

Upon inspection it will be seen that in the specific form illustrated, in which the abutment on the lid is outside of and rides on the abutment of the box, the locking of the lid against sliding except when it is resting upon the face of the box is dependent upon the fact that the shoulder $A^{12}$, formed by cutting away the lug, as described, is within the circle part of which forms the path described by the corner of the abutment $B^{12}$ as the lid swings, so that a segment of the circle is cut off at that shoulder, and the fact that the shoulder which coincides with the path of sliding of the corner of the abutment is a chord and not a tangent is due to the fact that said corner has moved less than ninety degrees in the swinging movement from the point at which it was in line with the center of the elongated bearing of the pivot in order to reach the point at which the lid seats on the box-face, since if it had traveled ninety degrees the path of sliding from that point would be tangent to its path of rotation up to that point and not a chord. The effectiveness of the device as a means of preventing the sliding of the lid before it seats on the box-face is greatly increased by this characteristic. The upward-sliding movement of the lid necessary to disengage the shoulders also disengages the lips $A^2$ and $B^2$ and also tends to increase the tension of the spring C, which is secured to the lid at its lower end and which is caused to slide at its upper end on the corner $A^{13}$ of the boss in a direction not parallel to the spring, and the opening movement of the lid is made against the tension of the spring until such movement has proceeded to the point at which the reaction of the spring on the corner or angle $A^{13}$ is in a direction radial to the pivot, and from that point on until the spring becomes tangent to the curve of the rear upper side of the boss its tension tends to lift the load, and its friction on the curve of the boss after this point is passed tends to hold it wherever it may be set. The locking of the cover is therefore effected both at the hinge end by the engagement of the shoulders $A^{12}$ and $b^{12}$ and at the lower end by the engagement of the lips $A^2$ and $B^2$. I make the elongation of the socket $A^{11}$ and the lap of the shoulders $b^{12}$ and $A^{12}$ greater than the engagement of the lips $A^2$ and $B^2$, so that when the lid is closing the engagement of the shoulders occurs first and insures the complete closing of the lid down onto the box before any sliding movement can take place, and thereby prevents the possibility of a failure to enter the lip $B^2$ within the box and to engage it behind the lip $A^2$. It will be noticed that this structure permits the formation of the hood B′, so that its upper web at the point $B^{14}$ may come down snugly onto the upper side of the boss A′ when the lid is closed, thereby excluding all dust at that end, but leaves it free and at some distance from the upper side of the boss throughout the swinging movement, as will be understood from the dotted-line position in Fig. 2. This is of considerable importance, because when the construction is such that the lid is obliged to swing about a pivot whose position is unchanged either the fit of the lid at any part corresponding to the hood B′ on any part of the box corresponding to the boss A′ must be made so free and loose that dust is liable to enter, or if it is to be made close the parts must be machined or dressed into accurate form by the tool, an ordinary casting with its natural rough surface being incapable of being fitted so closely as to exclude dust without danger of increasing the difficulty of swinging the lid to a degree liable to cause the lid to be broken in the operation. It should be noticed also that although this lid has two movements in opening—first, a sliding movement, and, second, a swinging movement—the operator is under no necessity to regard this fact, because when he seizes the nose $B^{15}$ of the lid to open it the natural upward movement will first slide it upward, disengaging its locked parts at the hinge and lip and then swinging it up; also, in closing the lid no attention need be paid to the peculiar features of construction, the lid being simply swung down regardless of the locking devices, because as soon as the two shoulders $A^{12}$ and $b^{12}$ come into line the action of the spring C and gravity tend to cause the cover to slide down, and the initiation of this sliding movement prevents any return of the lid which might be caused by rebound from the box, and the continuously-sliding movement is thereby assured until the shoulder is fully engaged and the lips are locked.

The spring may be secured at its lower end to the lid in any convenient manner, somewhat otherwise when the lid is pressed than when it is cast; but I do not herein make claim to either of the modes of fastening illustrated, which will therefore not be described beyond the statement that the spring is rigidly held at that end.

I prefer to make my improved box so that if the lid designed for it is lost an ordinary lid may be employed, and for that purpose I perforate the lug A′ from side to side at the point at which the pivot-trunnions are seated when the lid is free to swing—that is, at the upper end of the elongated sockets. This is the position at which an ordinary pivot-bolt would be required to secure an ordinary lid, and the extension of the aperture through the lug in no manner interferes with the operation of my lid designed for the box.

When it is desired to make this lid of pressed steel instead of casting it, certain detail modifications may be adopted with advantage. The blocks $B^{12}$ are in such construction most conveniently riveted in place in the corners of the hood B′, as shown in Fig. 5. The trunnions $B^{11}$ are preferably replaced by a continuous bolt $b^{10}$, which may extend through the lug A′, which is correspondingly modified by having the elongated pivot-sockets extended through the boss instead of being formed merely in its opposite sides, as is sufficient when only the trunnions are to be received in such seats. The trunnions, however, may be employed in the pressed-steel construction, in which case the change described will not be made in the formation of the boss A′; but in order to secure the trunnions rigidly, as they should be, to the lid, since they cannot be made integral with it when it is formed of pressed steel, and since they would not be sufficiently rigid if merely rooted in the side webs of the hood, as in the case of the cast form, I prefer to form the lid when of pressed steel from a blank, such as illustrated in Fig. 6, in which, in addition to the material necessary to form the hood, (which is shown already pressed into shape in Fig. 6,) there are lugs $B^4$ $B^4$ projecting from the upper edge and adapted to be folded, as seen in Fig. 7, to form an eye which will clasp the trunnion or pivot-bolt, and to make this eye secure I terminate the lug in a reduced rivet-tongue $b^4$, which is inserted through an aperture $b^{40}$, when the lug is folded to form the eye, and is clasped down upon the upper side of the sheet metal, as shown as in Figs. 4, 6, and 7. If the trunnion is inserted while the pressed steel is hot, the shrinkage in cooling will cause the eye to grip the trunnion securely enough to hold it. The same construction may be adopted when a continuous bolt is employed. When adapting the lug $B^4$ to the use of a continuous bolt, which is preferable with a pressed-steel lid, the pivot-socket, elongated to permit the movement of the pivot-bolt, is extended entirely through the lug. In order to adapt the box in this form to receive an ordinary lid, I make the slot for a smaller bolt than is customarily employed as a pivot for the ordinary lid, and at the upper portion of the slot I enlarge it to conform to the usual size of bolt, the excess necessary to accommodate the larger bolt being cut away at the rear side, as seen in Fig. 5. This excess in this position no more interferes with the action of the device when my lid is employed than does the excess of aperture, which consists in boring through the lug to accommodate the bolt in the form shown in Fig. 1, because the spring in any event tends to hold the pivot-bolt against the forward side of the slot; but when the ordinary lid has to be substituted and secured by the ordinary bolt such ordinary bolt is as perfectly held as if there were no elongation of the aperture below it. In the pressed-steel form the lip $B^2$ is riveted on, as seen in Fig. 5.

I claim--

1. In combination with the car-axle box having the lug A′ at the top, said lug having trunnion-sockets in its opposite sides, and slots leading from the rear of the lug to such sockets respectively, and having the forwardly-projecting angle $A^{13}$ in front of the pivoted line of the hinge; the lid having the hood B′ overhanging the lug, and the spring secured to the lid and extending within such hood and bearing upon said forwardly-projecting angle of the lug; the hood having trunnions projecting inwardly toward each other from its opposite sides adapted to seat in the trunnion-sockets and to enter the same through the slots leading thereto.

2. In combination with a box having at the upper side a boss provided with pivot-bearings for the lid which are elongated in the direction of the face of the box, the lid pivoted to the box at such elongated bearing and having a hood which overhangs the pivot; a spring secured to the lid and extending within such hood and bearing upon the forward side of the lug with a tendency to hold the lid closed, said hood being adapted to come into contact with and stop at the upper side of the lug above the pivot and rearward of the bearing of the spring against such lug when the pivot is at the lower limit of the elongated bearing, and to be clear of the upper surface of the lug when the pivot is at the upper limit of the bearings.

3. In combination with the box, the lid hinged thereto at the top and adapted to swing about its hinge to reach the face of the box and to slide at said hinge transversely to the pivot thereof and in a direction parallel to the face of the box; abutments on the box and lid respectively which are engaged throughout the swinging movement of the lid about its hinge-pivot until the lid seats on the face of the box and pass out of engagement at the point at which the lid so seats, whereby the sliding movement of the lid is prevented until the lid is seated on the face of the box and permitted after such seating has occurred; and means for locking the lid by such sliding.

4. In combination with the box, the lid hinged thereto and adapted to swing about its hinge to reach the face of the box, the pivot of such hinge being fixed with respect to the lid, and the box having bearings for such pivot slotted or elongated in a direction parallel to the face of the box, the lid and box having coöperating parts about the lid-pivot, of which the part which pertains to the lid bears on the part which pertains to the box while the lid is swinging over from open to closed position at the upper limit of the range of the sliding movement of the pivot, the said part on the box being cut away at least to a line parallel with the box-face commencing at the last point passed by the part on the lid when the lid reaches the box-face; whereby said part on the box presents obstruction to the sliding movement of the lid until the latter is seated on the face of the box and offers no obstruction to the sliding movement thereafter; and means for locking the lid by such sliding movement.

5. In combination with the box, the lid hinged thereto and adapted to swing about its hinge to reach the face of the box, the pivot of such hinge being fixed with respect to the lid, and the box having bearings for such pivot slotted or elongated in a direction parallel to the face of the box, the lid and box having coöperating parts about the lid-pivot, of which the part which pertains to the lid bears on the part which pertains to the box while the lid is swinging over from open to closed position at the upper limit of the range of the sliding movement of the pivot, said part on the box being cut away to a line parallel with the box-face commencing at the last point passed by the part on the lid when the lid reaches the box-face, whereby said parts pass out of engagement obstructive to the sliding movement of the lid when the lid reaches the box-face, one of said parts being continued from the point at which they pass out of such engagement in a plane parallel to the face of the lid, whereby reverse rotation after the sliding of the lid is prevented.

6. In combination with the box and the lid hinged thereto at the upper side and adapted to swing about such hinge to reach the face of the box and to slide on the face of the box, the lid and the box having coöperating abutments, the abutment on the lid riding on the abutment of the box as the lid swings about its pivot at the upper limit of the range of its sliding movement; the one of said abutments which is interior or nearer the pivotal axis of the hinge being cut away at the plane of a chord of the arc of the path of contact of the two abutments in the swinging movement of the lid, and parallel to the plane of its sliding movement on the box-face, the other abutment being cut away at a plane coinciding with the plane of said chord when the lid is seated on the box-face.

7. In combination with the box and the lid hinged thereto at the upper side and adapted to swing about such hinge to reach the face of the box and to slide on the face of the box, the abutment on the lid riding on the abutment of the box as the lid swings about its pivot at the upper limit of the range of its movement, said abutment on the lid being so located that from the point at which it is in a plane containing the axis of the pivot of the hinge and parallel to the face of the box until the lid reaches the face of the box, it travels through less than ninety degrees about the axis of the pivot, said abutment on the box being cut back toward said axis at least to a line parallel to a plane at the face of the box commencing at the point reached by the corner of the abutment on the lid when said lid reaches the box-face.

8. In combination with the box having the lug A′ at the top provided with pivot-bearings for the lid which are elongated in the direction of the face of the box; the lid pivoted at such bearings and adapted to slide on the face of the box and having an abutment $B^{12}$, whose corner rides over the lug as the lid swings about said pivot at its highest position, said corner being so located that from the point at which it is in line with the center of its elongated bearing until the lid reaches the face of the box, it travels through less than ninety degrees about the center of said swinging movement, said lug being cut back toward said center, at least to a line parallel to the face of the box, commencing at the point reached by said corner when the lid reaches the box-face.

9. In combination with the box having the lug A′ at the top provided with pivot-bearings for the lid which are elongated in the direction of the face of the box, the lid pivoted at such bearings and adapted to slide on the face of the box and having an abutment $B^{12}$ whose corner rides over the lug as the lid swings about said pivot at its highest position, said corner being so located that from the point at which it is in line with the center of said elongated bearing until the lid reaches the face of the box, it travels through less than ninety degrees about the center of said swinging movement; said lug being cut back toward the center, at least to a line parallel to the face of the box, commencing at the point reached by said corner when the lid reaches the box-face, the lid having a lip on its inner surface adapted to overhang and engage within the lower margin of the box-opening, the sliding movement permitted by the elongation of the bearings being greater than the engagement of the lip behind said margin.

10. In combination with the car-axle box having a boss at the top provided with a pivot-bearing for the lid elongated in the direction of the face of the box, and the lid pivoted at such elongated bearings; the lug being apertured from side to side at the upper end of said elongated bearing to receive the pivot-bolt; the bolt-aperture thus provided being more extensive in some directions than the pivot-bearings, whereby a bolt suitable for said bolt-aperture, being inserted therethrough, is retained at the upper end of said elongated bearings notwithstanding their elongation.

11. A car-axle-box lid of pressed sheet metal formed from a blank having the lug $B^4$ terminating in the rivet-terminal $b^4$ and folded to embrace the pivot-bolt or trunnion; the rivet-terminal $b^4$ penetrating the sheet metal and clenched down thereupon; substantially as set forth.

12. In combination with the box having the lug A′ at the top, the lid hinged at such lug and adapted to slide at the hinge transversely to the pivot thereof; the lug having the forwardly-projecting angle $A^{13}$ in front of the pivotal line of the hinge; the spring C secured to the lid and having its upper end adapted to bear upon said projecting angle, and extending thence in a direction approaching the plane of the face of the box, substantially as set forth.

13. A car-axle box provided with pivot-bearings, in combination with a lid hinged in said bearings and provided with a locking engagement with said box, a leaf-spring secured at one end to said lid, an angle, as $A^{13}$, upon which the free end of said spring is adapted to bear and slide, the tension of said spring being adapted to aid in swinging the lid shut and then to exert thereon a downward pressure to cause the same to engage the margin of the box-opening, substantially as described.

14. The combination with a car-axle box of a lid therefor constructed to have swinging and sliding motions and a spring associated with said box and lid and operating to first swing the lid inwardly and then slide it downwardly, substantially as described.

15. A car-axle box provided with pivot-bearings, in combination with a lid hinged in said bearings and provided with a locking engagement with said box, a leaf-spring interposed between said box and lid and secured at one end to said lid, the tension of said spring being adapted to aid in swinging the lid shut and to exert thereon a downward pressure to cause the same to engage with the box, substantially as described.

16. A car-axle box provided with a lid loosely pivoted thereon and adapted to have swinging and sliding motions, in combination with a leaf-spring secured at one end to said lid and bearing upon a portion of the box, said spring being adapted by its tension first to rotate the lid toward the box-opening and then to exert on the said lid pressure to cause the lid to slide downwardly, substantially as described.

In testimony whereof I affix my signature, in the presence of two witnesses, this 6th day of December, 1897.

ALVIN C. McCORD.

Witnesses:

GEORGE L. CRAGG,

LYMAN W. BARBER.